Figure 1:
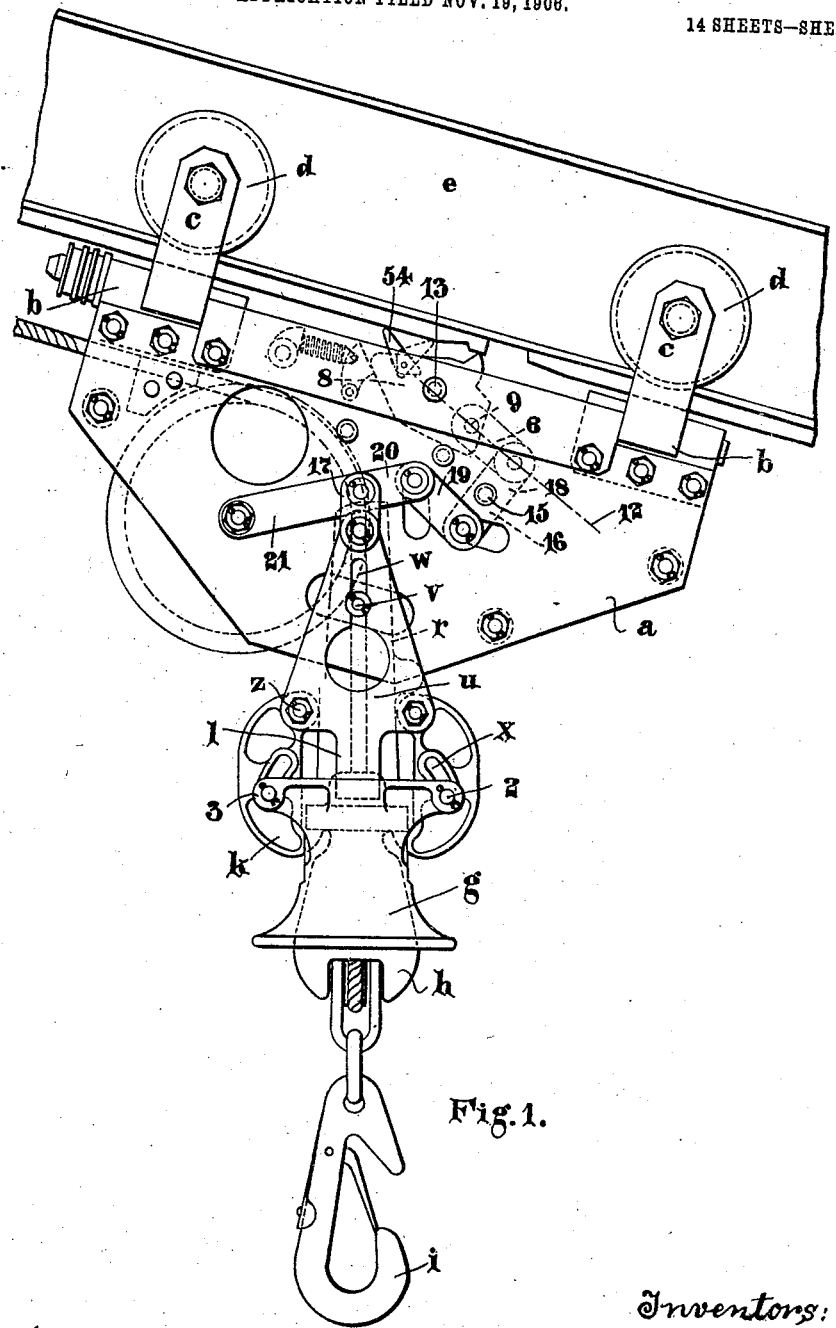

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 1.

Attest:
Ewd L. Tolson.
Bent M. Stahl.

Inventors:
Joseph Temperley,
John R. Temperley, &
William Alexander,
By Spear, Middleton, Donaldson & Spear
Attys.

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 3.

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 4.

Attest:
Ewd L. Tolson.
Benth. Stahl.

Inventors:
Joseph Temperley,
John R. Temperley, &
William Alexander,
By Spear, Middleton, Donaldson & Spear
Atty's.

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 5.

No. 394,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 7.

Attest:
Edwd L. Tolson.
Benth Stahl.

Inventors:
Joseph Temperley,
John R. Temperley, &
William Alexander,
By Spear, Middleton, Donaldson & Spear
Attys.

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 9.

Attest:
Ewd L. Tolson.
Bent. M. Stahl.

Inventors:
Joseph Temperley,
John R. Temperley, &
William Alexander,
By Spear, Middleton, Donaldson & Spear
Atty's.

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 11.

No. 894,083. PATENTED JULY 21, 1908.
J. R. & J. TEMPERLEY & W. ALEXANDER.
APPARATUS FOR RAISING, LOWERING, AND CONVEYING OR TRANSPORTING LOADS.
APPLICATION FILED NOV. 19, 1906.

14 SHEETS—SHEET 12.

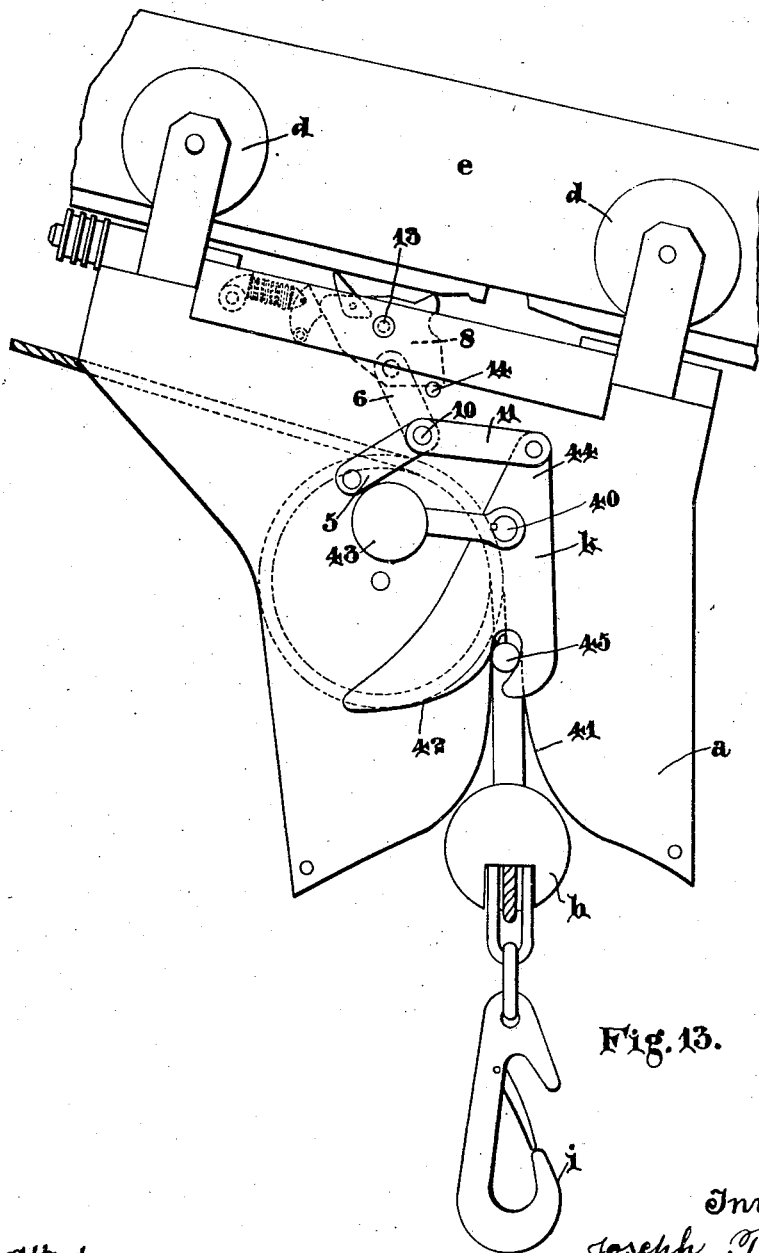

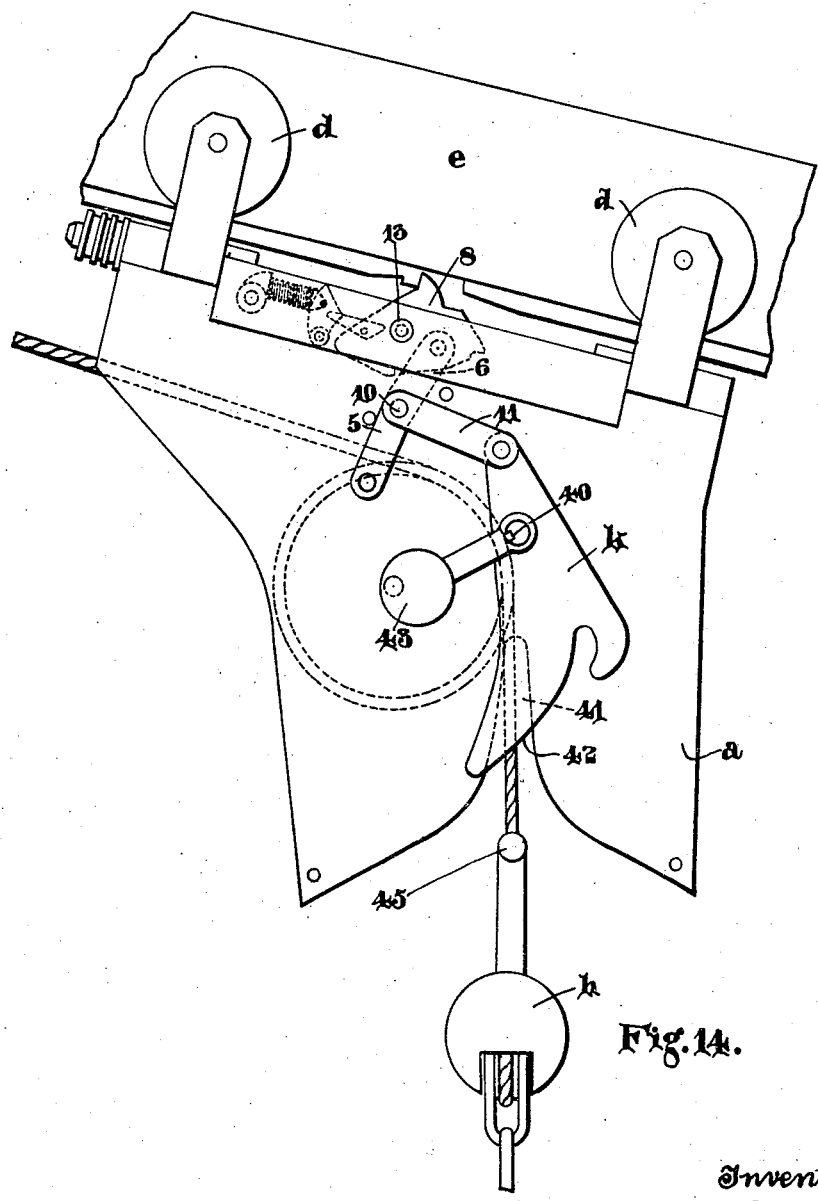

UNITED STATES PATENT OFFICE.

JOHN RIDLEY TEMPERLEY, JOSEPH TEMPERLEY, AND WILLIAM ALEXANDER, OF LONDON, ENGLAND.

APPARATUS FOR RAISING, LOWERING, AND CONVEYING OR TRANSPORTING LOADS.

No. 894,083.  Specification of Letters Patent.  Patented July 21, 1908.

Application filed November 19, 1906. Serial No. 344,100.

*To all whom it may concern:*

Be it known that we, JOHN RIDLEY TEMPERLEY, JOSEPH TEMPERLEY, and WILLIAM ALEXANDER, subjects of the King of Great Britain and Ireland, residing at 72 Bishopsgate Street, Within London, England, have invented certain new and useful Improvements in Apparatus for Raising, Lowering, and Conveying or Transporting Loads, of which the following is a specification.

Our invention relates to improvements in apparatus for raising, lowering and conveying or transporting loads of the type having automatic devices controlled by the lifting rope or chain whereby when the load is raised it may be sustained, locked and traversed, unlocked and lowered again.

The object of the present invention is to improve the construction, efficiency and safety of such devices.

According to this invention the automatic controlling mechanism is mounted in a frame which is suspended from the wheel-carrying members by hinges situated centrally or approximately centrally below and closely under the supporting beam, so that, when the frame and load swing, the central longitudinal plane of the frame shall not swing outside or much outside the intersection of the plane of the wheels with the supporting rail whereby the tendency for the wheels to lift on one side during heavy swinging of the load is reduced and whereby hinging of the mechanism connected to the load suspending hook or hooks and to the locking mechanism for the purpose of permitting lateral swing of said mechanism may be avoided.

The bell or fall-block guide is hinged to the frame to permit longitudinal swing of the bell, *i. e.,* in a plane parallel to that of the track, the load sustaining hooks or the like are connected to sliding links carried in guides on the bell and the sliding links are attached by a jointed connection so that the sliding links and the hooks may swing with the bell and at the same time be free to move vertically when the locking mechanism is actuated, the bell itself not being lifted, whereby greater security is obtained against accidental movement of the mechanism.

The device is arranged so that the fall block or ball on entering the bell shall come in contact with portions of the sliding links or of the suspending hooks and lift them instead of lifting the bell, the sliding links or hooks being so placed that they can only be reached by the block or ball and not by the rope or other moving part, whereby increased security against inadvertent actuating of the controlling members is obtained.

Figure 2:
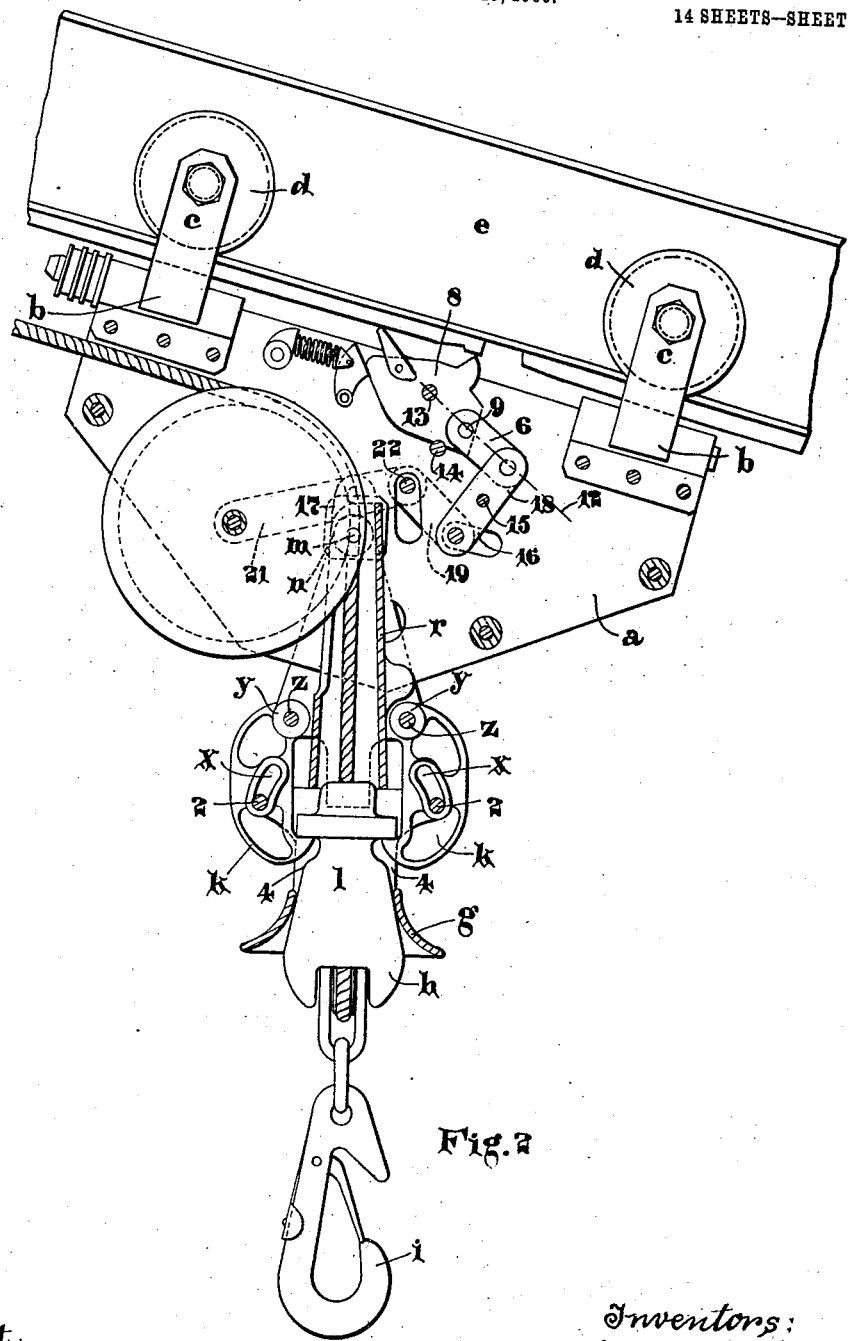
Figure 3:
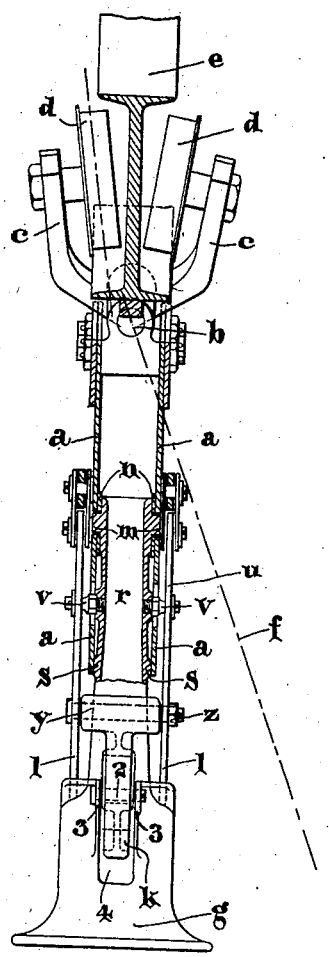
Figure 4:
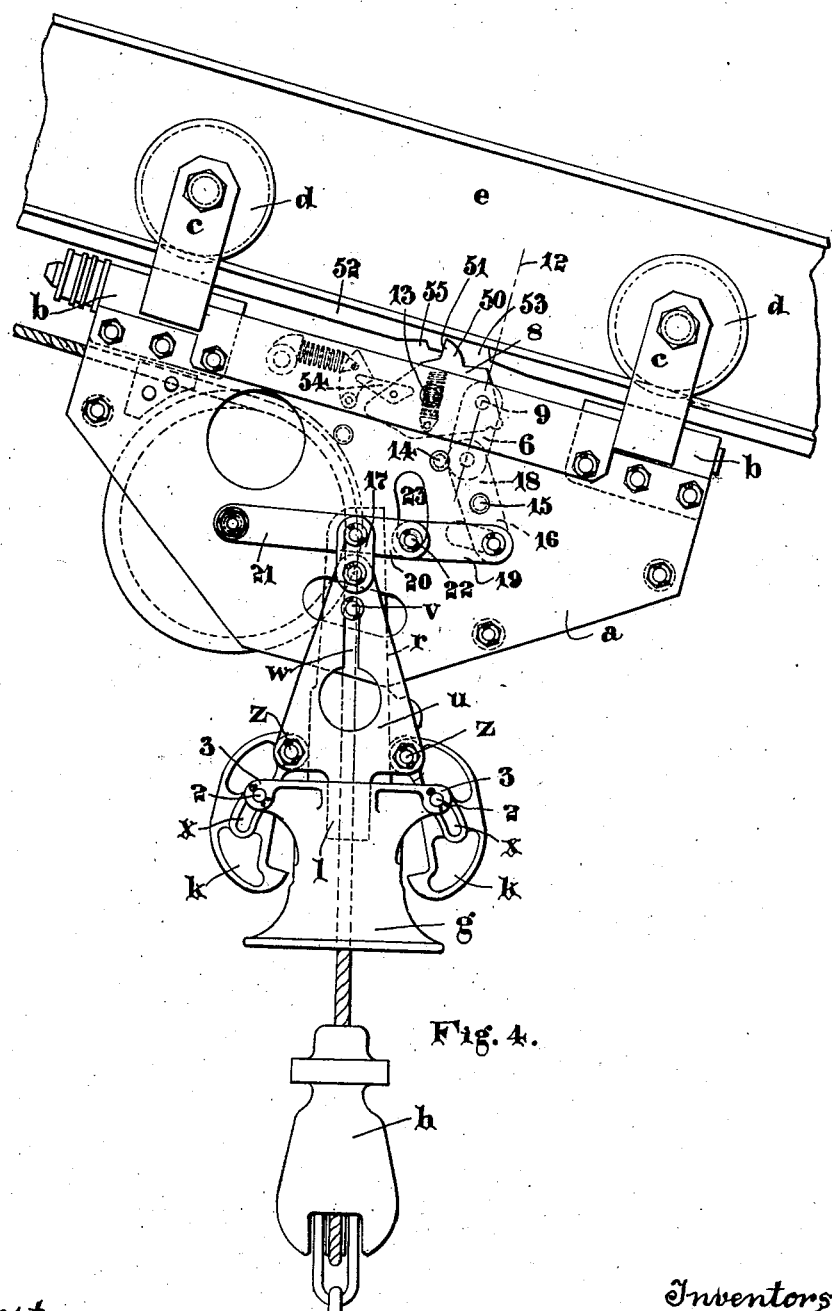

In the accompanying drawings which illustrate various modes of carrying our invention into effect and which form part of our specification, Figure 1 is a side elevation of a carriage according to one form of our invention, the parts being shown in the positions they assume when traversing of the carriage is in progress. Fig. 2 is a side sectional elevation of Fig. 1, showing one side plate removed and the bell in section. Fig. 3 is a part sectional end elevation of Fig. 1. Fig. 4 is a similar view of the same device but showing the parts in the positions they assume when hoisting or lowering of the load is in progress. Figs. 5 and 6, 7 and 8, 9 and 10, 11 and 12, 13 and 14 are similar but diagrammatic views to Figs. 1 and 4 respectively of modified forms of the invention or of the locking gears employed.

According to our invention, instead of hinging the lower part of the traveling carriage to the upper portion and forming a joint in the rods or mechanism connecting the load suspending hooks to the locking mechanism so as to allow the load to swing in a lateral direction, as has hitherto been usual, we mount the whole of the mechanism in one frame which may conveniently consist of a pair of side plates, $a, a$, and we suspend the same by hinge joints, $b, b$, from the horns, $c, c$, carrying the traveling wheels, $d, d$. The hinges are preferably arranged centrally or practically centrally below and closely under the supporting beam or track, $e$, so that when the frame, $a$, and load swing, the central longitudinal plane ($f$ in Fig. 3) shall not swing outside or substantially outside the points of intersection of the wheel planes with the supporting flanges or rails, whereby the tendency for the wheels to lift on one side during heavy swinging of the load and carriage is reduced. The whole carriage may thus swing sidewise through a large angle without causing the wheels on either side to lift from the track. An important advantage of this construction of carriage is that any convenient mechanism for connecting the load suspending hook or hooks to the locking mechanism may be used, it being now rendered unnecessary to hinge that mechanism for the purpose of allowing it to swing crosswise with reference to the track; moreover it allows a much greater angle of swing than was possible with the devices as hitherto constructed. The construction of the mechanism may be thus simplified and the number of working parts reduced.

According to our invention we attach the guide frame or bell, g, for guiding the ball or block, h, which is secured to the hoisting hook, i, into engagement with the load sustaining hook or hooks, k, to the carriage by pivots, m, which may be formed upon a hollow extension, r, of the bell, g, passing between the plates, a, a. These pivots, m, pass through holes in the carriage plates, a, a, which may be thickened there by securing against them side plates, n, n, shown in dotted lines in Fig. 2 and in section in Fig. 3. The bell may thus swing about its pivots, m, but cannot be raised in the direction of its vertical axis. The bell extension, r, may be provided with bearing strips, s, s, (Fig. 3) which make a sliding fit between the lower parts of the side plates a, a. The load sustaining hooks, k, k, are formed with long bosses, y, y, (Fig. 3) through which pins, z, z, pass to connect them to sliding links, u, u. These links are guided to permit movement relatively to the bell parallel to the axis of the latter only. This may be done by means of pins, v, v, screwed into the bell extension, r, and projecting through straight slots, w, w, (Figs. 1 and 4) in the sliding links and by providing the links with extensions passing through guide holes in the top of the bell and extending downwards close to the sides thereof sufficiently far for the fall block or ball above the load and lifting hook to be able to strike it and actuate locking mechanism. The hooks, k, k, are provided with inclined slots, x, x, through which pass guide pins, 2, 2, carried by lugs, 3, 3, from the bell.

The bore of the extension, r, of the bell is made smaller than that of the bell itself, and in the bell slots or openings, 4, are formed through which the points of the load sustaining hooks enter. The guided ends, l, l, of the sliding links by which the locking mechanism is controlled are well out of reach of the cable and can only be actuated by the fall block or ball.

Figure 5:
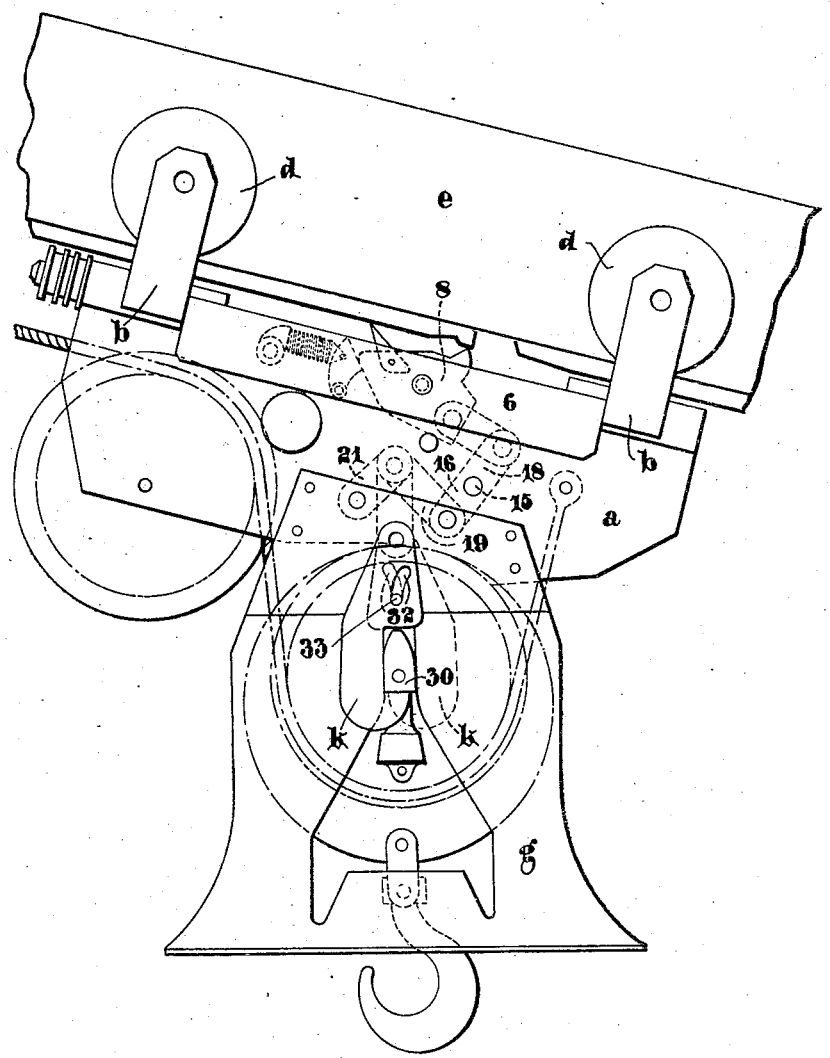
Figure 6:
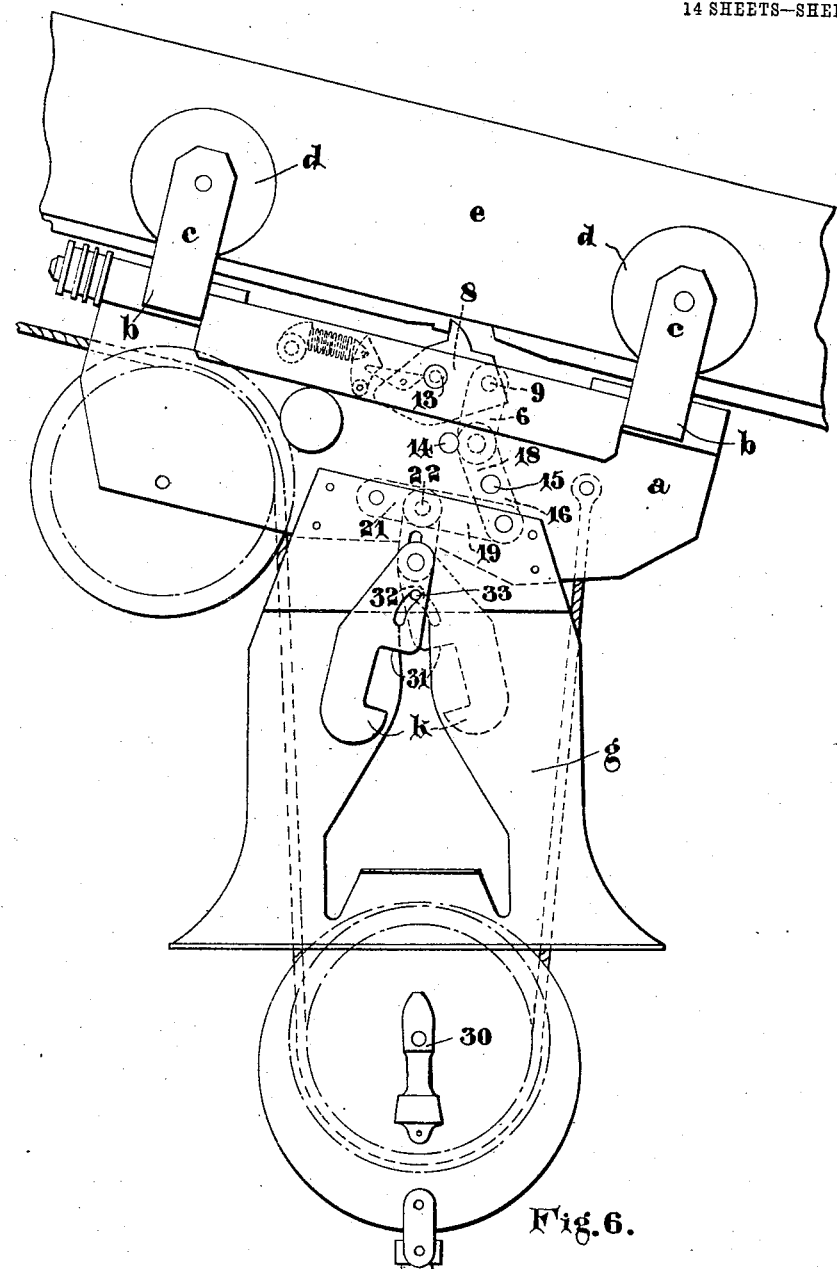

In double purchase hoists it is unnecessary to mount the guide or bell for the fall block upon pivots. The guiding bell may be secured directly to the hinged carriage as shown in Figs. 5 and 6, which represent diagrammatically the positions of the parts when the load is sustained and being raised, respectively. In this case the fall block or the load-carrying hook is provided with projections, 30, one on each side, which are adapted to bear against portions, 31, on the load sustaining hooks, k, k, the upper portions of which are provided with curved slots, 32, through which passes a pin, 33, carried by the bell. By these means, as the load rises, the projections, 30, enter the bell and bear against the portions, 31, raising the hooks which are thereby caused to close under the projections, 30, to sustain the load. As before described the upward movement actuates the locking mechanism.

It will be seen that as, according to our invention, the bell does not rise and fall with the locking mechanism and the ends of the links controlling the locking mechanism are out of reach of the hoisting cable, it is practically impossible for untimely movement of the locking mechanism to take place and much greater security of operation is assured than can be the case where the bell is movable vertically or the actuating members of the locking device can be moved prematurely by accidental contact of the rope or other part therewith or by any external causes.

The sliding links, u, u, are connected with any suitable locking mechanism in the carriage, such for instance as those consisting of a horned lever with slotted cams or toggle levers, by any convenient jointed connection adapted to permit the sliding links and sustaining hooks to swing with the bell and at the same time to be free to move to actuate the locking mechanism.

The mode of locking or releasing the carriage to the track with a horned lever may be briefly described with reference to Figs. 1 and 4 as follows:—When hoisting is in operation, as shown in Fig. 4, the horn, 50, of the lever or cam, 8, is in engagement with the end, 51, of a portion of lock rail, 52, at a space, 53, between one portion and the next, the horned lever being prevented from turning on its pivot, 13, by suitable means connected to the load sustaining mechanism. By raising the load and actuating the mechanism the horned lever is turned to the position shown in Fig. 1 thus unlocking the carriage from the rail and permitting the carriage to travel in either direction with the load sustained. Assume it to be moved to the left until another space, 53, is passed. The pawl, 54, in passing, 53, will turn into the position shown in dotted lines in Fig. 1. If now the carriage be moved a short distance to the right the pawl, 54, will engage a notch, 55, and turn the horned lever back into the position shown in Fig. 4, thereby releasing the load and locking the carriage.

Various modified and improved arrangements and constructions of locking mechanisms may be used in conjunction with the sliding link and pivoted or fixed bell which we have devised and described hereinafter and illustrated in the accompanying drawings.

Figure 7:
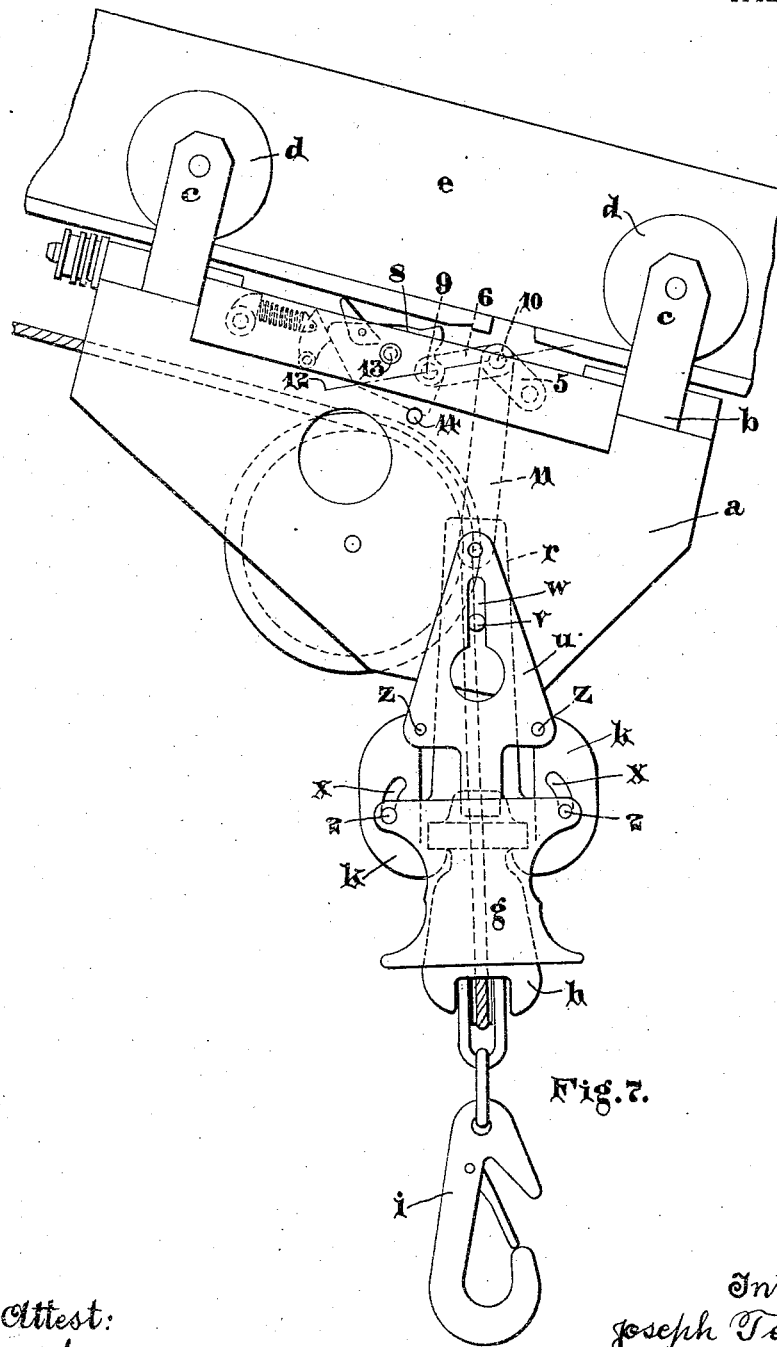
Figure 8:
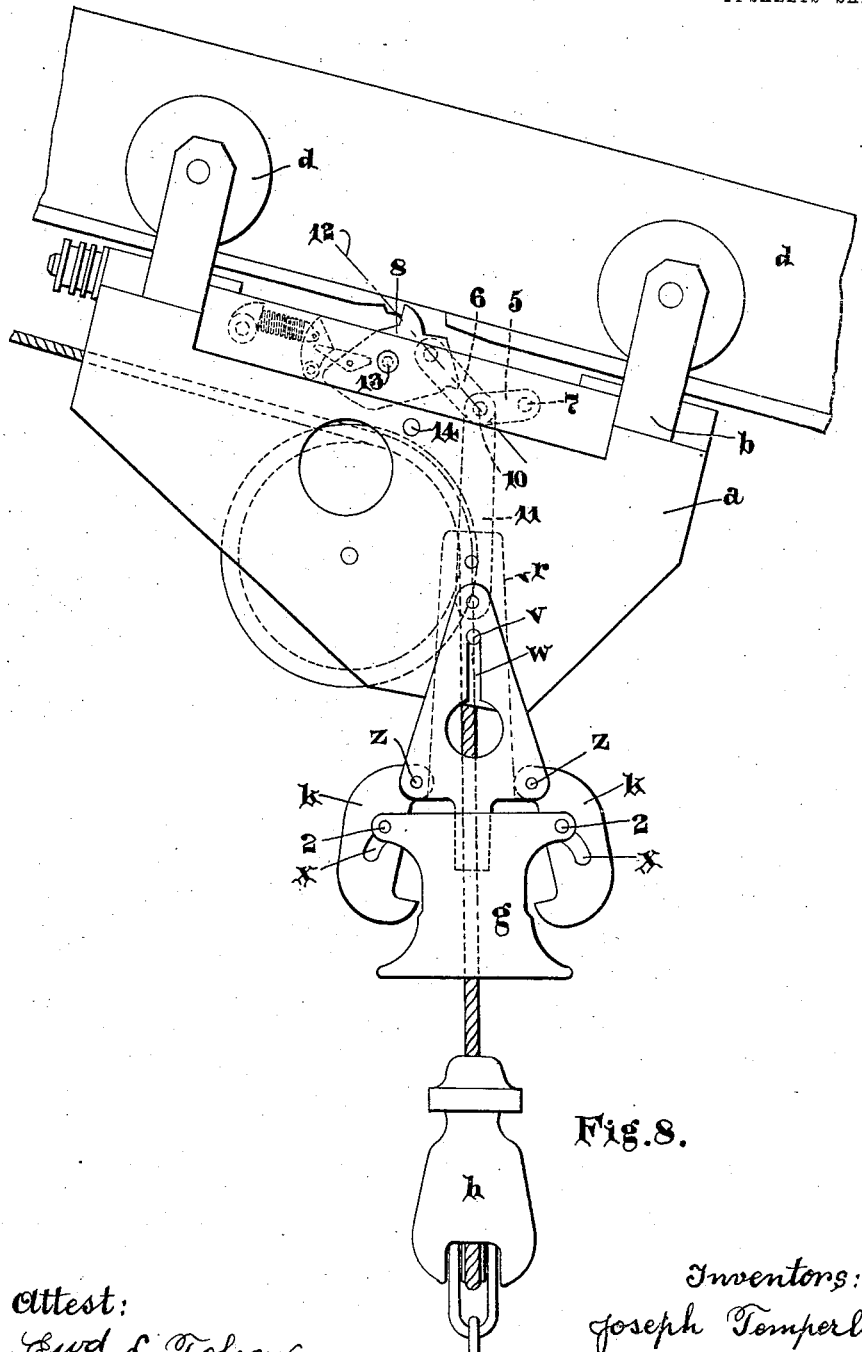

In Figs. 7 and 8 we use a single set of toggle levers composed of members, 5 and 6, the former pivoted to the frame of the carriage at 7, and the latter at 9, to the pivoted horned lever, 8, which locks the carriage to the transporter beam or track. At the apex, 10, of the toggle or near thereto are links, 11, only one being shown in the diagram, which connect the sliding links, $u$, $u$, and consequently the load sustaining hooks, $k$, $k$, to the toggle. The toggle is arranged so as to be flexed in one direction or the other according as the load is sustained or freed and the longitudinal axis, 12, of the toggle member, 6, is arranged to move to one side or other of the center, 13, on which the horned lever is pivoted so that in the extreme positions shown in Figs. 7 and 8 the combination forms a positive lock to the horned lever and to the load sustaining hooks alternately. Suitable stopping means are provided as for instance the pins, 14, and $v$.

Figure 9:
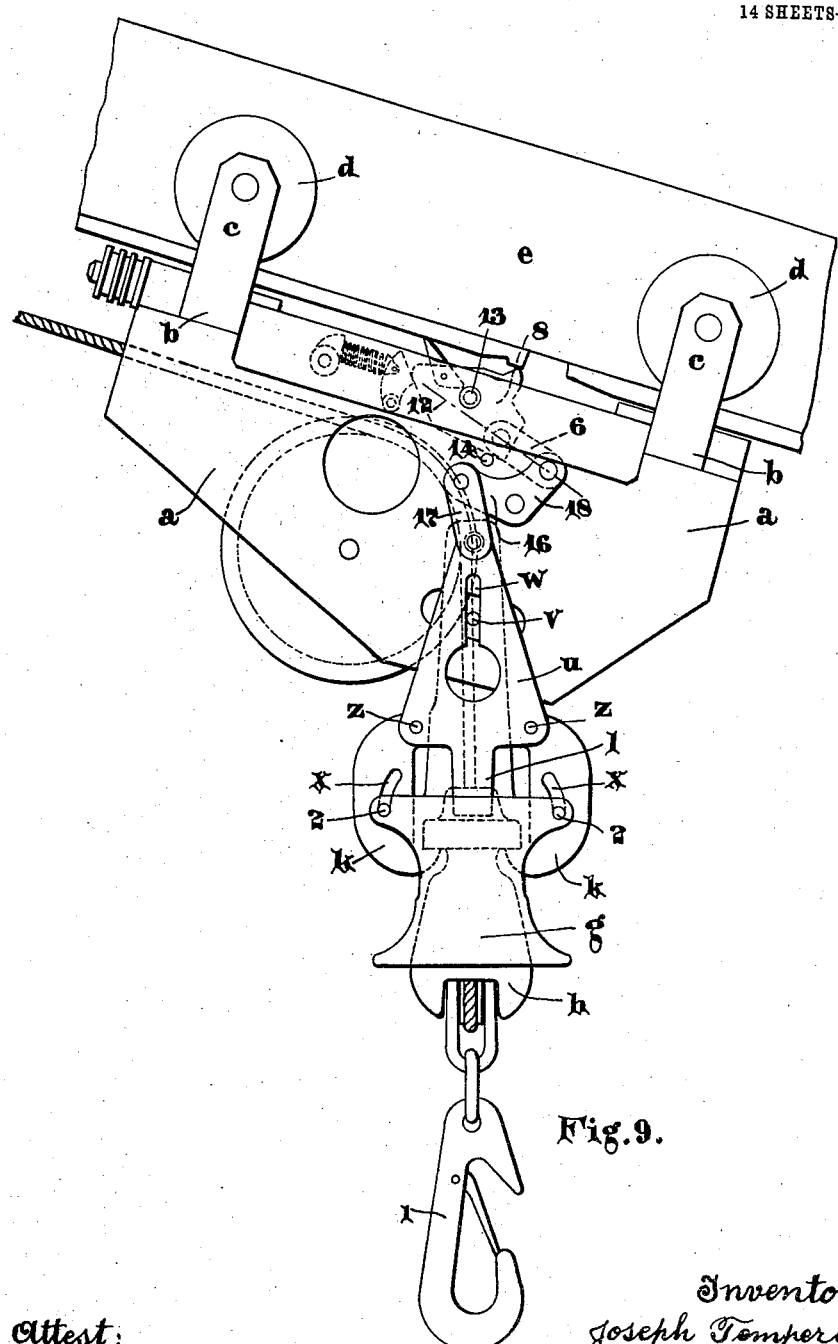
Figure 10:
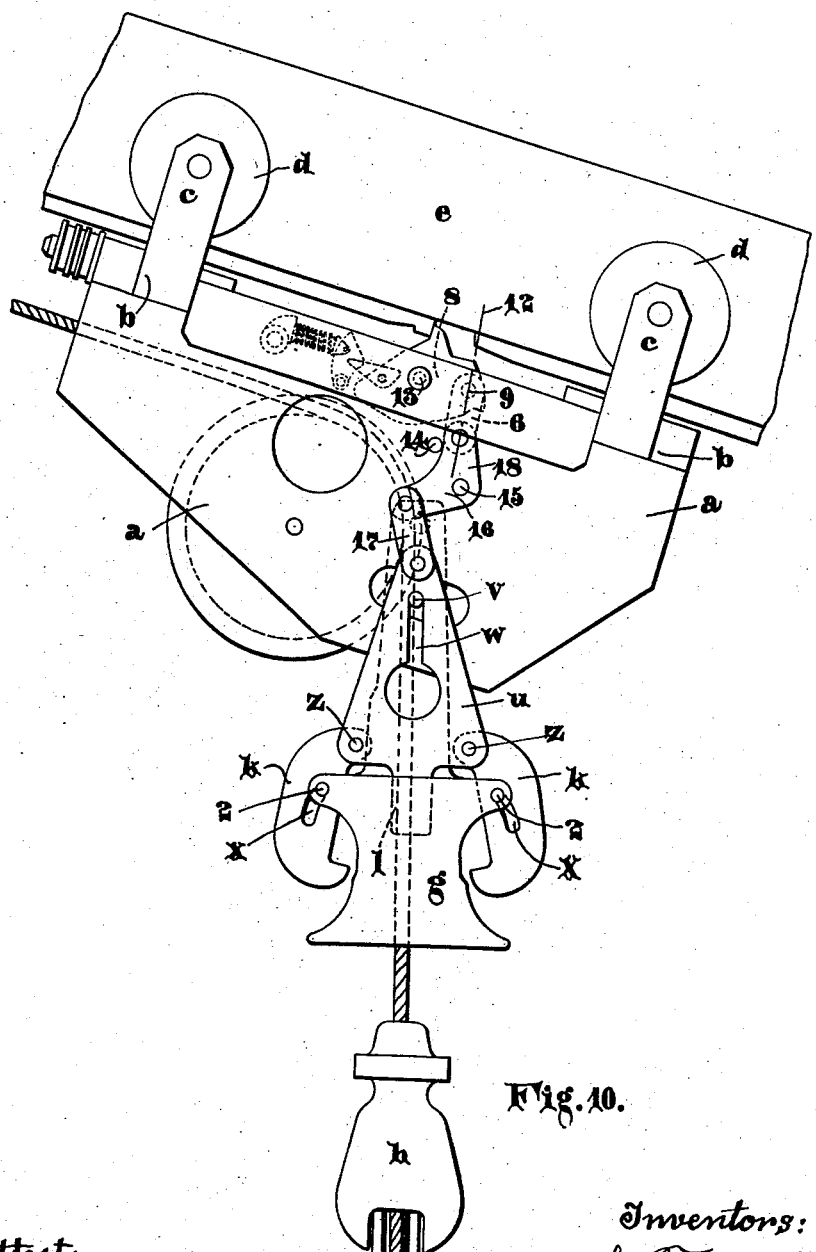

In another modification, shown in Figs. 9 and 10, instead of employing a toggle adapted to be flexed in both directions and having the load sustaining attachment at or near the apex or knuckle as described with reference to Figs. 7 and 8, we employ a rocking lever pivoted at 15, to the frame of the carriage. To one arm, 16, of the rocking lever is attached by intermediate links, 17, the sliding links, $u$, of the load sustaining mechanism and the other arm, 18, is connected to the horned lever, 8, by a link, 6, the center line of which moves to one side or other of the center, 13, on which the horned lever turns, as in the case of the toggle levers described with reference to Figs. 7 and 8, the result being the same. Thus in Figs. 1 and 4, a rocking lever pivoted at 15, and having one arm, 18, connected by a link, 6, to the horned lever, 8, has its other arm, 16, connected by a link, 19, with the end, 20, of a lever which is pivoted at its other end, 21, on the axle of the traveler sheave, and to which the sustaining mechanism is connected by the intermediate links, 17. In this case, when the load is sustained as shown in Fig. 1, the toggle formed by the lever, 21, and link, 19, is locked, the center line 12, of the link, 6, passing below the pivot of the horned lever which is prevented from turning by the stop pin, 14. When the load is being raised or lowered the horned lever locks the carriage to the track, being prevented from turning in one direction by the toggle, 6, 18, and in the other direction by the link, 19, lever, 21, and pin, 22, in the slot, 23.

Figure 11:
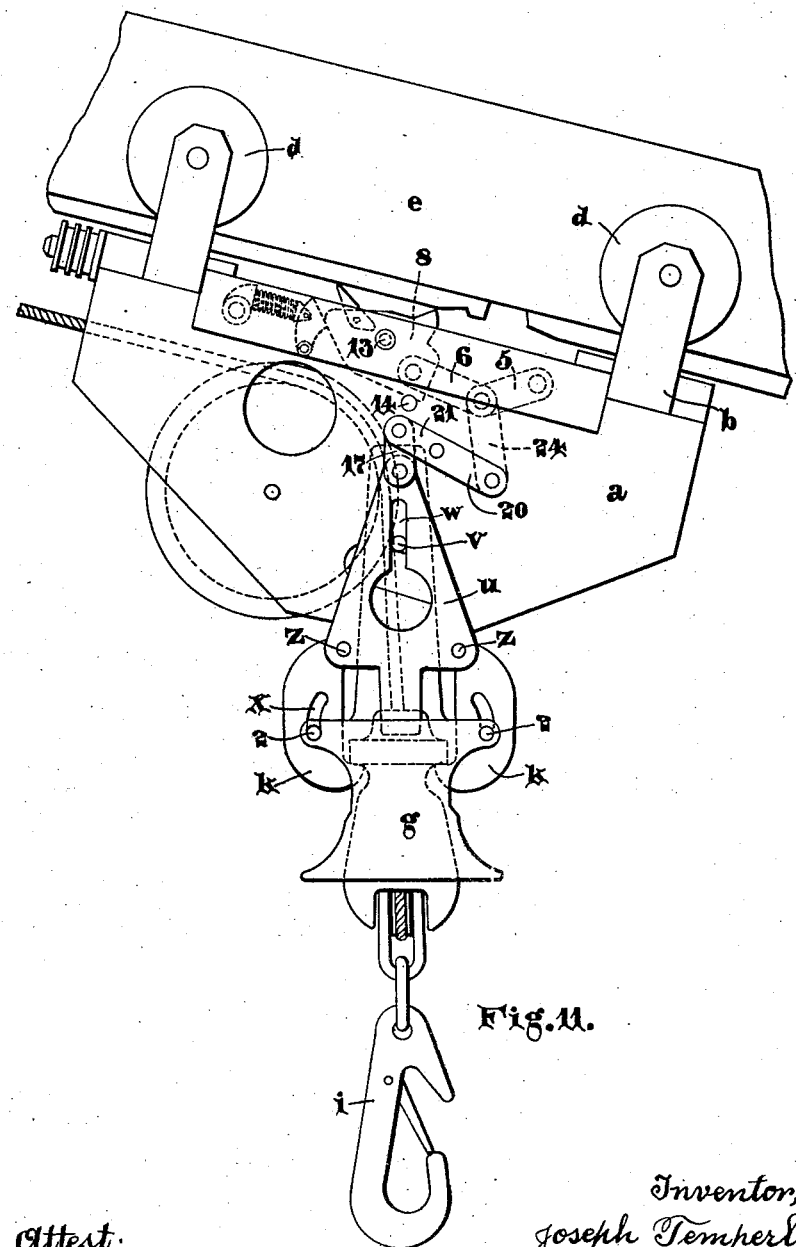
Figure 12:
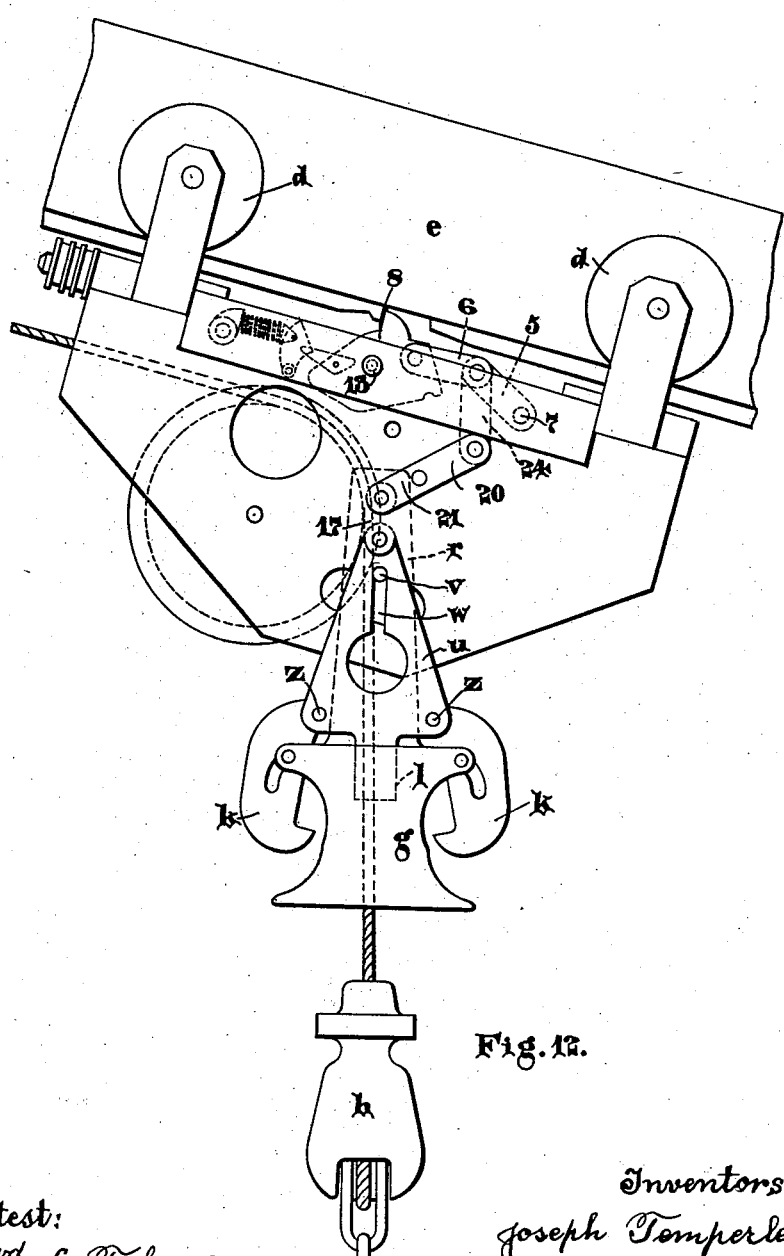

In Figs. 11 and 12, a set of toggle members, 5, and 6, is connected at the apex by a link, 24, to one arm 20, of a rocking lever, the other end, 21, of which is connected by a link, 17, to the sustaining mechanism. The manner in which this locks will be apparent by reference to Figs. 11, and 12, and needs no further description.

In Figs. 13 and 14 we have shown a slotted cam and sliding pin locking device. A horned lever or cam 8, is adapted to lock the carriage to the beam or track by a turning movement. In the cam, 8, we provide a slot one portion of which, 25, is formed at an angle to the other part, 26. In the side frames we also form slots, 27, with which the portion, 26, of the slot in the cam is adapted to coincide when the hoisting or lowering operations are in progress as shown in Fig. 14. The other portion, 25, is adapted to lie across the slot in the frame when the load is being sustained as shown in Fig. 13. A pin, 28, is free to slide in the slots and from this pin are suspended the load sustaining hooks, $k$, $k$, directly by links, $u$, $u$, and 17.

In operation, when the horned lever, 8, is turned so as to lock the carriage (Fig. 14) to the track the slots coincide and allow the sliding pin, 28, to drop and with it the load sustaining hooks which thus open and free the load. The sliding pin now being at a distance from the center of the horned lever and passing through both slots locks the horned lever. When the load is lifted, the fall block or ball lifts the sustaining hooks and causes the sliding pin to rise in the slots until it is close to the center of the horned lever, $i.\ e.$, at the commencement of the part, 25, when the pressure of the horn on the projection on the track causes the horned lever to turn. This unlocks the carriage from the track and at the same time the portion, 25, of the slot turns across the slots in the frame and sustains the sliding pin. The load is therefore sustained by the suspending hooks which are supported from the sliding pin.

In a modification of the load sustaining gear, shown in Figs. 13 and 14, we mount the sustaining hooks one on each side of the carriage upon pivots, 40, so that they shall merely turn into or out of engagement with the fall block or ball, or a member carried thereby, instead of rising or falling at the same time as turning. Slots, 41, with a curved opening are formed in the side plates, $a$, of the carriage, so that as the ball rises, a pin, 43, carried by it may enter the slots and guide the ball. The hooks are provided with curved or inclined faces, 42, against which the pin, 45, bears and slides when rising up the guide slots. The hooks are provided with one or more weights 43, which hold them in the position shown when the load is being raised. To an arm or arms, 44, attached to the hooks or to the pivot pin, 40, so as to move with the hooks, we connect any of the locking mechanisms consisting of toggle or rocking levers or slots and sliding pins or combinations thereof.

We are aware that it has been proposed before to use pivoted suspension hooks, weighted or spring pressed or both, adapted to interlock with pivoted horned levers for alternately locking the load suspenders and the carriage. The interlocking has, however, generally merely consisted of notches and projections on the levers which engage with each other when the levers are moved to their extreme positions, the action depending entirely upon counterbalance weights or upon springs; that is, there has been no positive or permanent and direct connection between them. Such mechanisms have proved to be unreliable in practice and they frequently fail to act or they act prematurely and are therefore sources of danger to the operators. The combinations, however, of pivoted suspension hooks of the character shown in Figs. 13 and 14 with the horned lever and any of the forms of interlocking mechanism described herein or hitherto known entirely overcome these defects and provide safe and improved mechanisms having a direct connection between the pivoted hooks and levers and forming a positive lock for the same in their alternative positions.

Having now described our invention what we claim as new and desire to secure by Letters Patent is:—

1. In combination in a transporter a carriage having wheels; supporting means for the carriage; a frame hinged to the carriage immediately below said supporting means, the points of contact of the wheels with said supporting means being so close to the axis of the hinge of the frame that the central longitudinal plane of the frame shall not swing substantially outside the intersection of the plane of the wheels with that of the supporting means; and automatic controlling mechanism.

2. In combination in a transporter; a carriage having a plurality of pairs of wheels; supporting means for the carriage; a frame hinged to the carriage immediately below said supporting means in order that the central longitudinal plane of the frame shall not swing substantially outside the intersection of the plane of the wheels on one side with that of the supporting means and automatic locking, unlocking and load-sustaining devices.

3. In combination in a transporter; a carriage having a plurality of pairs of wheels; a supporting track for the carriage; a frame hinged to the carriage immediately below said supporting track in order that the central longitudinal plane of the frame shall not swing substantially outside the intersection of the plane of the wheels on one side with the supporting track; locking unlocking and load-sustaining devices carried by the frame; and means on the supporting track acting to control the locking and load-sustaining devices.

4. In combination in a transporter; a carriage mounted on wheels; supporting means for the carriage; a frame hinged to the carriage immediately below said supporting means, the distance between the points of contact of the wheels with the supporting means and the hinge being such that the central longitudinal plane of the frame shall not swing substantially outside the intersection of the plane of the wheels with the supporting means, a fall block guide and locking, unlocking and load-sustaining devices carried by the frame.

5. In combination in a transporter; a wheeled carriage comprising a frame, wheels and wheel-carrying members to which the frame is hinged close under the trackway on which the carriage moves; so that it may swing transversely to the trackway; a bell or fall block guide hinged to the frame so that it may swing longitudinally; locking and unlocking mechanism carried by the frame; links pivotally connected to said locking mechanism and slidable relatively to and guided by the fall block guide; load-sustaining hooks pivotally connected to said links and guided by said fall-block guide; means whereby the movement of the links in one direction brings the hooks into position for engaging the fall block to support the load and in another direction brings the hooks clear of the fall-block guide, and means external to the carriage for controlling the locking and unlocking means.

6. In combination in a transporter; a carriage; a fall block guide; locking, unlocking and load sustaining devices, said devices including a controlling member movable relatively to and extending into the fall block guide at a place accessible to the fall block but inaccessible to the rope or other moving part and a hook depending from said member; means on the fall-block and hook for guiding the latter on the movement of said member whereby the hook is moved into or out of engagement with the fall block.

7. In combination in a transporter; a carriage comprising a frame, wheels and wheel-carrying members to which the frame is hinged immediately below the trackway on which the carriage runs; a fall-block guide; locking, unlocking and load-sustaining devices; said devices including a controlling member movable relatively to and extending into the fall block guide at a place accessible to the fall block but inaccessible to the rope or other moving part and a hook depending from said member; means on the fall-block and hook for guiding the latter on the movement of said member whereby the hook is moved into or out of engagement with the fall block.

8. In combination in a transporter; a carriage comprising a frame, wheels and wheel-carrying means, said frame being hinged to the wheel carrying members closely below the trackway on which the carriage travels; a fall block guide pivoted to the frame; locking unlocking and load-sustaining devices including hooks adapted to engage with the fall-block on the cable of the transporter closing and opening means for said hooks sliding links pivotally connected to said hooks and projecting into the fall block guide at a point accessible to the fall-block but inaccessible to the rope and other movable parts; a horned lever; toggle lever mechanism connected to said links and to said horned lever; and means on the trackway coacting with the horned lever to tilt the same.

9. In combination in a transporter; a carriage comprising a frame, wheels and wheel carrying members to which the frame is hinged closely under the trackway; a fall block guide; locking, unlocking and load sustaining means, including a horned lever sliding links guided in the fall block guide and accessible to the fall block but not to other moving parts in the fall-block load sustaining hooks suspended from the links and toggle means pivotally connected to the horned lever and sliding links.

In testimony whereof, we affix our signatures in presence of two witnesses.

JOHN RIDLEY TEMPERLEY.
JOSEPH TEMPERLEY.
WILLIAM ALEXANDER.

Witnesses:
C. T. RODGLEY,
BERTRAM H. MATTHEWS.